Feb. 26, 1929.  
F. A. MALIN  
1,703,348  
METHOD OF MANUFACTURING HOLLOW WAX ARTICLES  
Filed April 23, 1928
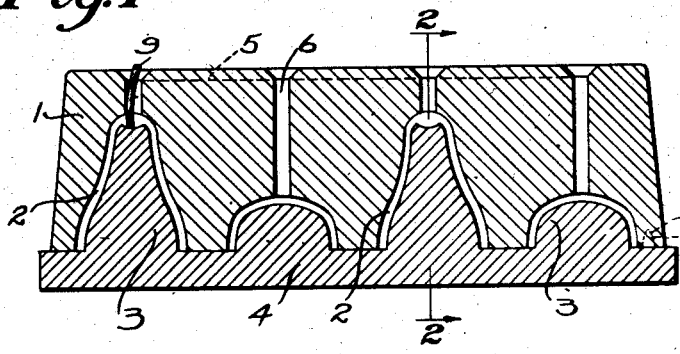
Fig.1
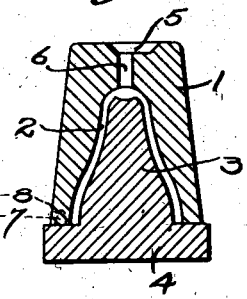
Fig.2
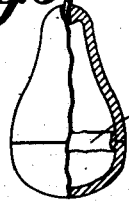
Fig.3
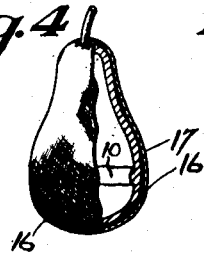
Fig.4
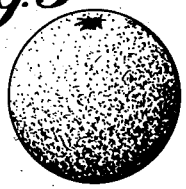
Fig.5
Fig.6
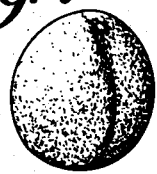
Fig.7
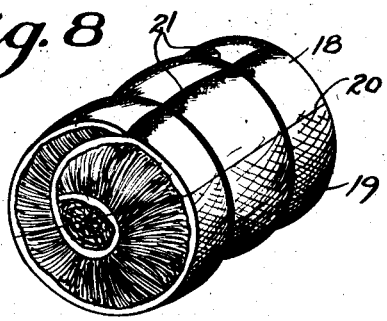
Fig.9
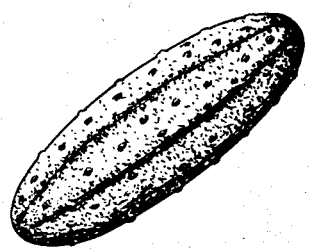
Fig.8
Frank A. Malin.  
INVENTOR  
BY 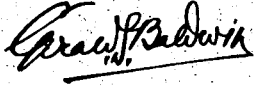  
ATTORNEY Patented Feb. 26, 1929.

1,703,348

UNITED STATES PATENT OFFICE.

FRANK A. MALIN, OF DETROIT, MICHIGAN.

METHOD OF MANUFACTURING HOLLOW WAX ARTICLES.

Application filed April 23, 1928. Serial No. 272,023.

It is an object of the invention to provide a method of manufacturing hollow wax articles representing such objects as fruit, vegetables, meat and the like in such near resemblance to the objects imitated as to be practically indistinguishable from the latter.

Another object of the invention is to provide a method of manufacturing such articles so that any desired number of duplicates of any one pattern may be quickly and easily made by an unskilled operator.

Numerous other objects of the invention will be mentioned as the specification proceeds, in which the method of manufacture is more fully described with the aid of the accompanying drawings, in which:

Figure 1 illustrates a longitudinal section of a matchplate in which the articles are poured in halves.

Figure 2 is a section on the line 2—2 of Figure 1.

Figures 3 and 4 both show an article representing a pear partly in section; in the former view the two halves of the article have just been placed together, and in the latter view the article has been finished.

Figures 5, 6 and 7 are views of articles in imitation of an orange, an apple, and a peach respectively.

Figures 8 and 9 show articles representing a roast of beef and a cucumber respectively.

Moulds, usually in the form of matchplates, as shown in Figures 1 and 2, are usually employed. The upper portion 1 of the mould has a plurality of cavities 2 therein, and the upward projections 3 on the lower mould portion 4 form cores in the usual manner. 5 indicates a longitudinal gutter along the top of the matchplate, and 6 denotes holes from the sides of the gutters extending downwards through the upper mould portion into the cavities 2. The upper and lower matchplate portions are held relative to one another as by pegs 7 on the lower portions which take into openings 8 in the upper portion.

Wax, usually ordinary paraffin wax, is heated until it is in a fluid state, it is then poured into the moulds to form halves of the articles to be made. When articles are made which represent fruit having stalks, short pieces of string 9 are inserted into the holes 6 into the portions of the articles which form their upper halves. The wax is then poured into the gutter 5 from which it runs down the holes 6 into the moulds. As the wax dries the pieces of string are held firmly in position, and the outwardly projecting portions of the string are stiffened by the wax so that they look like stalks. In order to expedite the cooling of the poured wax, and also to reduce the temperature of the poured wax below the point to which it would otherwise drop the moulds are submitted to a cold air blast. This further hardens the wax and makes it able, in a very short time, to withstand the next operation.

A heated container of fluid hard wax, frequently containing a percentage of beeswax and having a higher melting point than the paraffin wax, is kept in readiness. The two halves of an article are then taken, one of them is dipped into the hard wax so that some of the latter remains in the hollow part, and then the two halves are placed together and moved in such a manner that the fluid hard wax adheres to the inner side of the joint and binds the halves firmly together; the joint is shown at 10 in Figures 3 and 4. The united article is then held at its ends, substantially at right angles to the joint, and then rolled on a heated surface in such a manner as to render the joint invisible after having been dipped in the hard wax.

The moulds in which the halves of the articles are poured are preferably made from the actual objects imitated, so that representations of such objects as oranges or cucumbers, when produced, have their surfaces grained or marked in a similar manner to the actual objects themselves. After the halves have been joined as described, those in imitation of objects having grained or marked surfaces are marked around the joint by dies which impart the desired marking as the articles are rolled on them, otherwise that portion of the article would present a smooth appearance.

In the case of imitation apples, pears or peaches I generally use uncolored paraffin wax, whereas for oranges, cucumbers and other articles of a substantially uniform color I prefer to employ wax to which color has been added. In order to reproduce colors such as pinks and reds on imitations of such fruit as apples, pears or peaches I usually suspend them by their stalks and spray them with paint. By varying the method of spraying either a uniformly spread color or a streaked or shaded effect may be obtained.

In cases where articles have been poured in uncolored wax they may be colored to the desired base tone by repeated dipping in hard-wax that has been tinted after coloring as above described has been completed. In cases where the paraffin wax has been colored to represent the article imitated, the hard wax may be either colored or not as desired. Final application of hard wax 17 is however necessary in all circumstances as several immersions provide the finished article with a protective coating that both protects the color 16 underneath painted on the paraffin wax and also enables the article to withstand considerably more handling.

In the case of a joint of meat as shown in Figure 8 after the two halves 18 and 19 have been joined along the line indicated at 20 pieces of string 21 are tied around after the article has been joined and before it is dipped in the hard wax.

In order to produce the effect of bloom on a peach or cucumber, or obtain a mat, instead of a polished, finish on other articles, the articles should be placed in cornstarch after its final immersion in the hard wax and allowed to cool there. When cool just enough cornstarch will adhere to the article to give the desired effect, the rest will easily rub off.

Obviously articles other than those illustrated or referred to may be made in the same manner, moreover the method of manufacture is subject to such modifications as fall within the scope of the appended claims.

What I claim is:

1. The method of manufacturing hollow wax articles consisting of pouring heated wax into moulds so as to form the hollow article in separate halves, removing the halves from their moulds when set, picking up fluid wax in one half, placing the other half against it, moving the two halves so that the fluid wax forms a joint around the inside of the assembled article at the junction of the halves, dipping the assembled article in the fluid wax, rubbing the article along its joint on a heated surface, and dipping the article in heated hard wax to form a protective coating all around it 2. The method of manufacturing hollow wax articles consisting of pouring heated wax in moulds so as to form the hollow article in separate halves, said moulds having a roughened surface on those portions which form the outer surfaces of the article, removing the halves from the moulds when set, picking up fluid wax in one half of the article, placing the other half thereon, moving the two halves so that the fluid wax forms a joint around the inside of the assembled article at the junction of the two halves, dipping the assembled article again in the fluid wax, rubbing the article along its joint on a heated surface, roughing the rubbed portion of the surface against a die so that it presents a similar appearance to remainder of the surface, and dipping the article in heated hard wax to form a protective coating all around it.

3. The method of manufacturing hollow wax articles consisting of pouring heated wax into moulds so as to form the hollow article in separate halves, removing the halves from their moulds when set, picking up fluid wax in one half, placing the other half thereon, moving the two halves so that the fluid wax forms a joint around the inside of the assembled article at the junction of the halves as it sets, dipping the assembled article again in the fluid wax, rubbing the article along its joint on a heated surface, dipping the article in heated wax to form a protective coating around it, and placing the article in powdered cornstarch to cool.

4. The method of manufacturing hollow wax articles consisting of pouring heated wax into moulds so as to form the hollow article in separate halves, removing the halves from their moulds when set, placing a piece of string in the opening of one mould into which the heated wax is poured so that one end of the string becomes imbedded in the wax and the remainder projects outwardly therefrom, so that the outwardly projecting portion of the string is surrounded and stiffened by wax so that it presents the appearance of a stalk, picking up fluid wax in one half of the article, placing the other half thereon, moving the two halves so that the fluid wax forms a joint around the inside of the assembled article at the junction of the two halves, dipping the assembled article again in fluid wax, rubbing the article along its joint on a heated surface, and dipping the article in heated hard wax to form a protective coating around it.

5. The method of manufacturing a hollow wax article consisting of pouring heated wax into moulds so as to form the hollow article in two separate halves, removing the halves from their moulds, when set, picking up fluid wax in one of the halves, placing the other half in position against it, moving the two halves so that the fluid wax as it sets forms a joint around the inside of the assembled article at the junction of the halves, dipping the assembled article again in the fluid wax, rubbing the article along its joint on a heated surface, coloring the surface of the article as desired, and dipping the article into heated hard wax that has been tinted to produce a base color, to protect the aforesaid coloring, and to form a protective coating around the assembled article.

FRANK A. MALIN.